Patented July 7, 1931

1,813,127

UNITED STATES PATENT OFFICE

HENRY B. SLATER, OF RIVERSIDE, CALIFORNIA, ASSIGNOR, BY MESNE ASSIGNMENTS, TO FOOD MACHINERY CORPORATION, OF SAN JOSE, CALIFORNIA, A CORPORATION OF DELAWARE

PROCESS OF TREATING FRESH FRUIT FOR RETARDING DECAY FROM BLUE AND GREEN MOLD

No Drawing.   Application filed July 28, 1925. Serial No. 46,655.

This invention relates to a process of treating fresh fruit for the market, and refers particularly to the process of treating citrus fruit for the retarding of blue and green mold decay, penecillium glaucum and penecillium digitatum.

In my copending application, Serial Number 538,360, filed February 21, 1922, there is described a process for effecting retardation of blue and green mold decay by treating the fruit with a hypochlorite solution, such as sodium hypochlorite, subsequent to which the fruit may be covered with a soft, waxy coating.

It is the object of the present invention to provide a process for sterilizing fruit by treatment with a hypochlorite which will (1), effect a more complete retardation of the blue and green mold decay; (2), lessen corrosive action of the treating solution upon the apparatus; (3), will facilitate the cleansing of the fruit; and, (4), permit a cleansing and sterilizing of the fruit at a lower cost.

The process of such copending application employed as a preferred sterilizing or fungicidal agent, the material sodium hypochlorite and I found that apparently the effective sterilizing agent of such solution was the hypochlorous acid liberated therefrom by the process of dissociation and that the effectiveness of the treatment may be materially increased if there is added to such solution a material adapted to facilitate the liberation of the hypochlorous acid from its combination with sodium. That is, in accordance with the present invention, it has been found that when, for example, an acid salt, such as sodium bicarbonate, is added to a solution of sodium hypochlorite so as to liberate hypochlorous acid from its combination with sodium in accordance with the reaction $$NaHCO_3 + NaOCl = Na_2CO_3 + HOCl$$

retardation of green and blue mold decay is much more effectively carried out.

Moreover, the reaction mentioned produces a solution in which the hypochlorite or hypochlorous acid solution is more stable due to the stabilizing influence of the sodium carbonate preventing the dissociation of the hypochlorous acid into chlorine and hydrochloric acid so that there will be no free chlorine present.

It has also been discovered that the addition of acid sodium carbonate to the sodium hypochlorite treating solution materially lessens any corrosive action upon the apparatus due to the increased alkalinity of the solution from the presence of sodium carbonate formed through the above reaction. Moreover, when, as in accordance with the process of my copending application, the excess treating solution is permitted to flow into a preliminary tank in which fruit is to be cleansed or washed, such solution is very effective in cleansing fruit and can be substituted in place of part at least of the materials heretofore employed in such cleansing tank; such as soda ash and what is commonly called soap powder with the resultant lowering in cost of treatment and increased efficiency in the cleaning action and decrease in the corrosive action of the apparatus in and about such initial or preliminary washing tank.

Various other objects and advantages of this present invention will be apparent from a description of a preferred form of the process, for which purpose a specific process is described in considerable detail, it being understood that the specific details of the process are given for the purpose of more clearly illustrating the invention, and are not to be regarded as limitations.

In accordance with the process of this invention, a hypochlorite solution is maintained in a treating tank at a concentration of approximately 1–10 grms. of available chlorine per liter. This hypochlorite solution may be prepared in various ways such, for example, as by the reaction between calcium hypochlorite and sodium carbonate for the purpose of forming sodium hypochlorite. It may be formed by addition of chlorine to an alkaline solution. I, however, prefer to form the sodium hypochlorite from a solution of common salt (NaCl) by electrolytic decomposition, the solution of common salt being of any suitable strength for the efficient electrolytic decomposition, say from 1 to 15% in strength or a density of 1 to 15° Bé. Such solution is subject to electrolysis in a suitable cell for the production of hypochlorite, the electrolytic decomposition taking place until the desired concentration of the produced sodium hypochlorite is obtained, this concentration being ordinarily such as to provide from 1 to 10 grs. of available chlorine per liter, as aforesaid.

From the electrolytic cell the produced hypochlorite solution is preferably continuously run into the treating tank wherein it is continuously maintained at desired strength by the continuous passing of fresh sodium hypochlorite solution from the electrolytic cell. To this treating solution of salt and sodium hypochlorite is added a suitable quantity of sodium bicarbonate ($NaHCO_3$) to convert the sodium of the hypochlorite into sodium carbonate liberating hypochlorous acid.

Fresh fruit for the market is preferably sterilized by such treating solution in the following manner:

The fruit in bulk is first freed from that portion thereof which is already in a decayed condition, preferably by passing the fruit on a sorting conveyor, where the decayed fruit is removed manually. Thereafter the fruit is first passed into a preliminary washing or soaking tank intended to facilitate the cleansing of the fruit. Into such preliminary washing or soaking tank, the excess treating solution from the treating tank is preferably passed and employed as a pre-cleansing agent upon the fruit, either with or without other cleansing agents.

The addition of such treating agent into this preliminary washing tank is found to prevent the washing tank and brushes of the apparatus from becoming infected with blue and green mold decay, and to effect a more complete cleansing of the fruit than with the materials heretofore employed for this purpose, and at a lower cost.

Fruit passing from this preliminary washing tank is passed under a spray of water and thence to brushes where the fruit is thoroughly brushed and cleaned, and thence passed through the hypochlorite or hypochlorous treating tank wherein the fruit is subjected to the hypochlorite or hypochlorous solution for a sufficient period of time to effectively sterilize all of the fruit from green and blue mold spores. The fruit should pass through the treating tank and should remain in such treating tank for several minutes, although the fruit is preferably in a continuous process of passing from one end of the treating tank to the other. The fruit leaving the treating tank is then subjected to a slight spraying of water to remove a part, but not all, of the treating solution; then passed to a drying apparatus and dried.

Subsequent to such treatment, the fruit is preferably covered with a preservative coating, adapted to restore the fresh or normal appearance of the fruit, and is then packed in the usual, or in any other desired, manner in boxes, crates or the like, for shipment. It is understood that the covering of the treated fruit with the preservative material is not essential to the invention in all its forms, but it may be omitted, if desired.

The invention is of the full scope set forth in the appended claims.

I claim:

1. A process of treating fresh fruit for the market which comprises subjecting the fruit to the action of a sterilizing solution containing a hypochlorite of an alkali-forming metal and an acid carbonate.

2. The process of treating fresh fruit for the market which comprises bringing the fruit into contact with a sterilizing solution containing a hypochlorite of an alkali-forming metal and sodium bicarbonate.

3. The process of treating fresh fruit for the retardation of blue and green mold decay which comprises passing the fruit through a solution containing sodium hypochlorite and sodium acid carbonate.

4. The process of treating fresh fruit for the market which comprises passing the fruit through a presoaking tank, then brushing the fruit, passing the fruit through a sterilizing solution containing a hypochlorite of an alkali-forming metal and acid carbonate, the excess treating solution of such disinfecting operation being passed into the presoaking tank.

Signed at Los Angeles, California, this 22nd day of July, 1925.

HENRY B. SLATER.